United States Patent
Bjarnason et al.

(10) Patent No.: US 12,041,079 B2
(45) Date of Patent: Jul. 16, 2024

(54) DETECTING PATTERNS IN NETWORK TRAFFIC RESPONSES FOR MITIGATING DDOS ATTACKS

(71) Applicant: Arbor Networks, Inc., Westford, MA (US)

(72) Inventors: Steinthor Bjarnason, Fjerdingby (NO); Ellis Roland Dobbins, Sarasota, FL (US)

(73) Assignee: ARBOR NETWORKS, INC., Westford, MA (US)

( * ) Notice: Subject to any disclaimer, the term of this patent is extended or adjusted under 35 U.S.C. 154(b) by 329 days.

(21) Appl. No.: 17/743,215

(22) Filed: May 12, 2022

(65) Prior Publication Data
US 2023/0283631 A1    Sep. 7, 2023

Related U.S. Application Data

(60) Provisional application No. 63/315,765, filed on Mar. 2, 2022.

(51) Int. Cl.
  *H04L 9/40*   (2022.01)
  *H04L 29/06*  (2006.01)
  *H04L 67/02*  (2022.01)

(52) U.S. Cl.
  CPC ...... *H04L 63/1458* (2013.01); *H04L 63/1416* (2013.01); *H04L 63/1425* (2013.01); *H04L 67/02* (2013.01)

(58) Field of Classification Search
  CPC ............ H04L 63/1458; H04L 63/1416; H04L 63/1425; H04L 67/02
  (Continued)

(56) References Cited

U.S. PATENT DOCUMENTS 10,050,986 B2 * 8/2018 Nelms ................. H04L 63/1425
10,375,026 B2 * 8/2019 Yang ..................... H04L 67/535
(Continued)

*Primary Examiner* — Haresh N Patel
(74) *Attorney, Agent, or Firm* — Foley & Lardner LLP

(57) ABSTRACT

A computer system and process for mitigating a Distributed Denial of Service (DDoS) attack to one or more protected computer networks by determining keywords and/or patterns in HyperText Transfer Protocol (HTTP) responses. Stored HTTP responses are analyzed to extract one or more HTTP characteristics for each stored HTTP response. One or more patterns having one or more keywords in each stored HTTP response is determined utilizing the extracted one or more HTTP characteristics for each stored HTTP response. A hash value is determined for each determined pattern, which is preferably stored in a hash structure accompanied by its respective determined HTTP characteristics. Each hash value accompanied by its respective determined HTTP characteristics is stored as a mitigation filter candidate if the hash value contains a determined pattern consisting of at least a predetermined percentage of all determined patterns stored in the hash structure. A determination is then made as to whether if each stored filter candidate contains an acceptable pattern, whereby filter candidates having acceptable patterns are removed from being a mitigation filter candidate. A regular expression is then generated for each stored filter candidate adaptable to be utilized as keywords in a DDOS mitigation filter.

20 Claims, 2 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 10,693,901 | B1* | 6/2020 | Chan ...................... | H04L 67/02 |
| 11,316,889 | B2* | 4/2022 | Jain ..................... | H04L 63/1458 |
| 2014/0157405 | A1* | 6/2014 | Joll ..................... | H04L 63/1425 |
| | | | | 726/22 |
| 2017/0310693 | A1* | 10/2017 | Howard ................ | H04L 63/166 |
| 2020/0050586 | A1* | 2/2020 | Pal ........................ | G06F 16/148 |
| 2020/0050607 | A1* | 2/2020 | Pal .................... | G06F 16/24549 |
| 2020/0097662 | A1* | 3/2020 | Hufsmith .............. | H04L 9/0643 |
| 2020/0259792 | A1* | 8/2020 | Devarajan ............. | G06F 21/554 |
| 2020/0259793 | A1* | 8/2020 | Pangeni .............. | H04L 41/5006 |
| 2020/0329069 | A1* | 10/2020 | Bjarnason ............. | H04L 41/142 |
| 2021/0120015 | A1* | 4/2021 | Rajaram ............. | H04L 63/1458 |
| 2022/0182398 | A1* | 6/2022 | St. Pierre ............ | H04L 63/0236 |
| 2023/0095870 | A1* | 3/2023 | Du ..................... | H04L 63/1416 |
| | | | | 726/23 |

* cited by examiner

DETECTING PATTERNS IN NETWORK TRAFFIC RESPONSES FOR MITIGATING DDOS ATTACKS

CROSS REFERENCE TO RELATED APPLICATIONS

This application claims priority to U.S. Patent Application Ser. No. 63/315,765 filed Mar. 2, 2022 which is incorporated herein by reference in its entirety.

BACKGROUND

1. Field

The disclosed embodiments generally relate to methods and systems for malware detection and mitigation, and specifically to algorithmically detecting patterns in network traffic responses for mitigating Distributed Denial of Service ("DDOS") attacks.

2. Description of Related Art

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DOS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDOS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc.

A particular type of DDOS attack is a DNS Reflection Attack, also known as a DNS Amplification Attack. In this attack, a malicious party use's open DNS servers to amplify their attack traffic by up to 100 times the original source traffic performing the attack. For instance, this form of DDOS attack can turn 100 MB's of DNS request traffic into 10 Gb's of DDOS traffic targeting an online resource. Ultimately this can lead to a service outage for legitimate users of the targeted system or web property.

It is generally understood that a reflection attack involves an attacker spoofing a target's IP address and sending a request for information, primarily using the User Datagram Protocol (UDP) or in some cases, the Transmission Control Protocol (TCP). The server then responds to the request, sending an answer to the target's IP address. This "reflection", using the same protocol in both directions, is why this is called a reflection attack. Any server operating UDP or TCP-based services can be targeted as a reflector. With regard to Amplification attacks, they generally generate a high volume of packets that are used to overwhelm the target website without alerting the intermediary. This occurs when a vulnerable service responds with a large reply when the attacker sends his request, often called the "trigger packet". Using readily available tools, the attacker is able to send many thousands of these requests to vulnerable services, thereby causing responses that are considerably larger than the original request and significantly amplifying the size and bandwidth issued to the target.

It is to be appreciated that in DNS amplification and reflection attacks, a malicious party controlling a small number of bot network systems, can amplify their attack traffic to create a crushing flood of data to the targeted machine knocking it offline. Thus, attackers are increasingly leveraging network protocols to launch reflection/amplification DDOS attacks which consist of amplified attack traffic that is difficult to distinguish from responses to legitimate application/service queries.

Hence, the architecture of the Internet makes networks and network devices vulnerable to the growing problems of such DDOS attacks. Therefore, the ability to avoid or mitigate the damages of a DDOS attack, while preventing blocking of valid hosts, is advantageous to devices located in a protected network.

SUMMARY

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

Generally, the illustrated embodiments relate to a system and method for analyzing fundamental aspects of observed network traffic, such as (but not limited to): protocols, port numbers, packet sizes, window sizes, protocol options, application-layer fields and values, to accurately differentiate attack traffic from legitimate traffic, even when there is significant variability in the attack traffic.

In accordance with an illustrated embodiments, in one aspect provided is a computer system and process for mitigating a Distributed Denial of Service (DDOS) attack to one or more protected computer networks by determining keywords and/or patterns in network traffic responses, such as HyperText Transfer Protocol (HTTP) responses. Stored HTTP responses are analyzed to extract one or more HTTP characteristics for each stored HTTP response. One or more patterns having one or more keywords in each stored HTTP response is determined utilizing the extracted one or more HTTP characteristics for each stored HTTP response. A hash value is determined for each determined pattern, which is preferably stored in a hash structure accompanied by its respective determined HTTP characteristics. Each hash value accompanied by its respective determined HTTP characteristics is stored as a mitigation filter candidate if the hash value contains a determined pattern consisting of at least a predetermined percentage of all determined patterns stored in the hash structure. A determination is then made as to whether if each stored filter candidate contains an acceptable pattern, whereby filter candidates having acceptable patterns are removed from being a mitigation filter candidate. A regular expression is then generated for each stored filter candidate adaptable to be utilized as keywords in a DDoS mitigation filter.

BRIEF DESCRIPTION OF THE DRAWINGS

So that those skilled in the art to which the subject disclosure appertains will readily understand how to make and use the devices and methods of the subject disclosure without undue experimentation, illustrated embodiments thereof will be described in detail herein below with reference to certain figures, wherein.

DETAILED DESCRIPTION OF CERTAIN EMBODIMENTS

Figure 1:
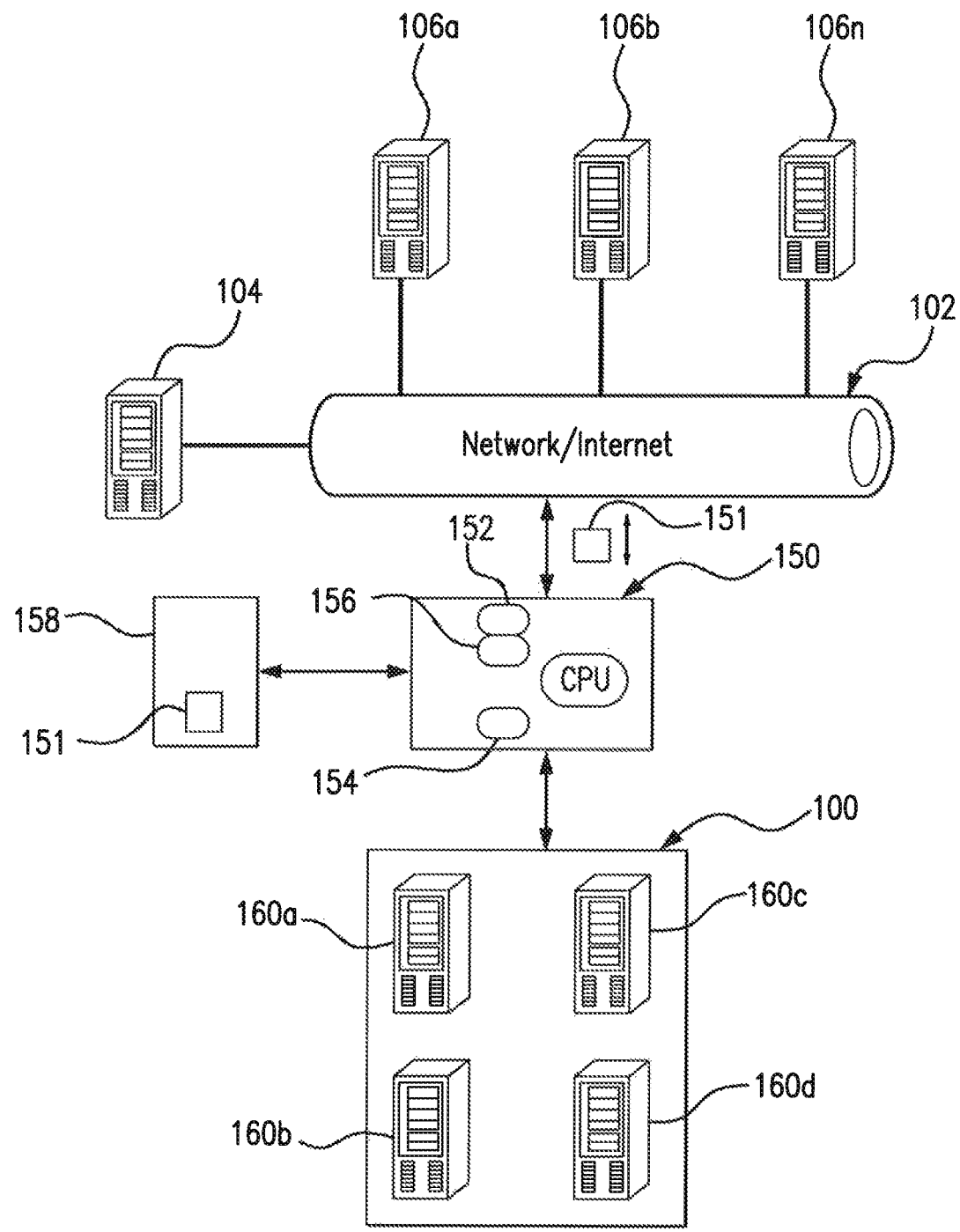
FIG. 1 is a schematic diagram showing network architecture and the relationship between an attack mitigation device and protected network according to an illustrated embodiment.

Aspects of the disclosed embodiments are illustrated in the following description and related drawings directed to specific illustrated embodiments. Alternate embodiment's may be devised without departing from the scope of the illustrated. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the embodiments described herein are not to be limited by what has been particularly shown and described, except as indicated by the appended claims.

It is to be further understood the illustrated embodiments of the present illustrated embodiments describe a system, apparatus and process for avoiding and mitigating the harmful effects of a DDOS attack on a computer system/device or network.

Turning now descriptively to the drawings, in which similar reference characters denote similar elements throughout the several views, FIG. 1 illustrates the relationship between a protected network 100, attack mitigation device 150, Internet 102, and external host devices 106a, 106b . . . 106n, 104.

In a typical implementation, the external host devices 106a, 106b . . . 106n, 120 (also referred to as external devices or host devices) attempt to connect to protected devices 160 within the protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred illustrated embodiment, the protected network 100 is protected by the attack mitigation device 150 preferably located between the Internet 102 and the protected network 100. Usually, the protected network 100 is an enterprise network, such as a school network, business network, and government network, to list a few examples. In other embodiments, the attack mitigation device 150 is located within the Internet, service provider network or enterprise network rather than as a network edge as illustrated. It is to be appreciated that when deployed within the protected network, traffic is diverted to the mitigation device 150.

The mitigation device 150 preferably includes a packet processing system preferably having an external high-speed network interface 152 and a protected high-speed network interface 154. Under current technology, these interfaces are capable of handling 1.0-100 Gbps, for example. The mitigation device 150 may further include processors 156 that preferably process the packets 151 received at interfaces 152 and 154. Additionally, a central processing unit (CPU), random access memory (RAM), and a storage medium 158 are preferably used to further support the processing of the received packets and are described in detail below in conjunction with FIG. 2. The storage medium 158 also preferably stores hash structures and filter candidates, as described in detail below.

In a typical implementation, the mitigation device 150 authenticates all external host devices 106*a*, 106*b* . . . 106*n*, 120 before allowing the external devices to access the protected devices 160 within the protected network 100.

According to exemplary configuration illustrated in FIG. 1, the attack mitigation device 150 may comprise a Client Edge (CE) device. The CE device can provide entry points into the protected network 100. In alternative configuration, the attack mitigation device 150 may comprise a virtual device. In other words, at least some of the embodiments do not require the attack mitigation device 150 to be a physical hardware device or to be located in a particular part of the network infrastructure, as long as the attack mitigation device 150 can be in the path of the incoming traffic to the protected network 100.

Figure 2:
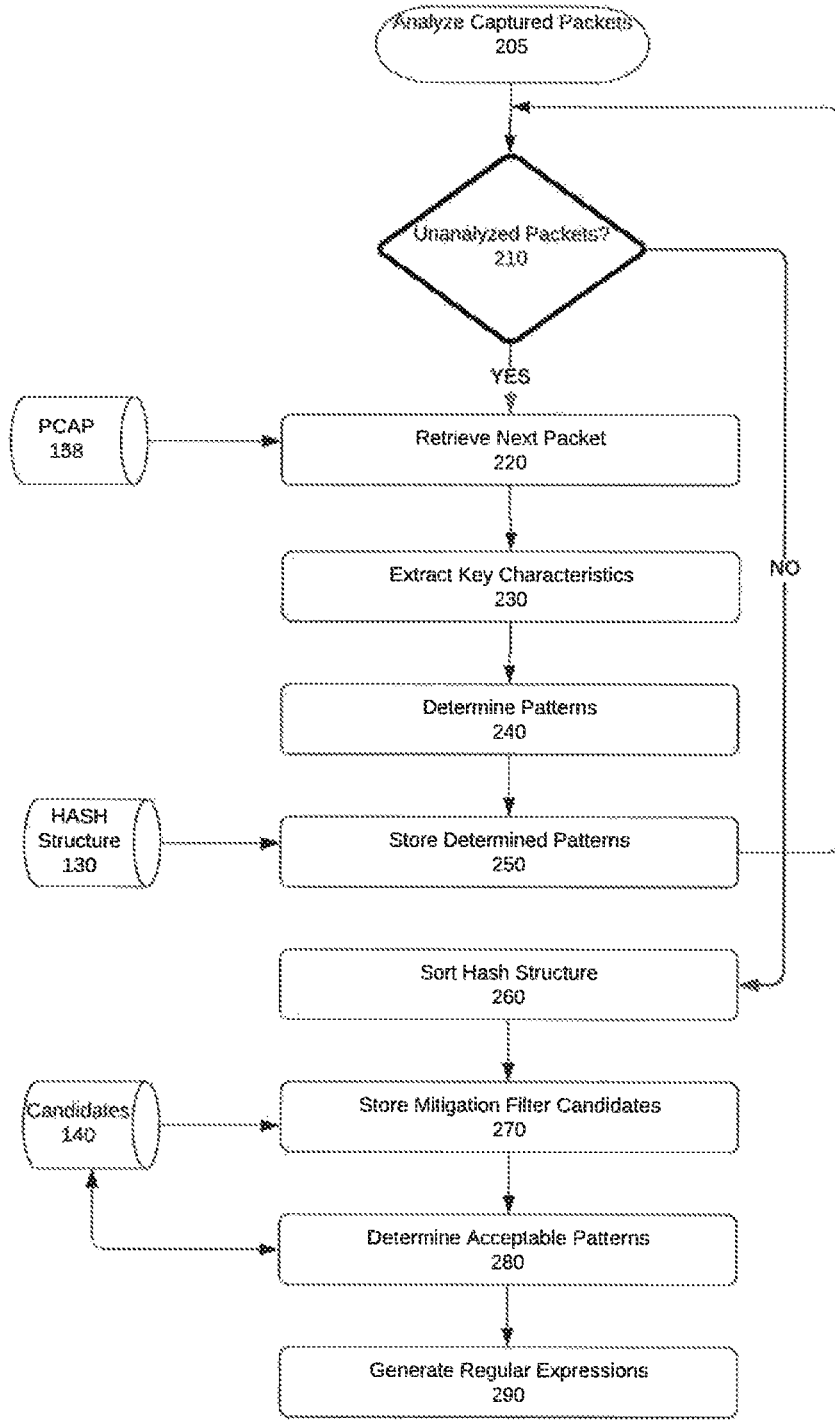
FIG. 2 is a flowchart illustrating a method for detecting patterns in HTTP responses in accordance with an illustrated embodiment.

Turning to FIG. 2, illustrates is an exemplary and non-limiting flowchart depicting a method for mitigating network attacks in mitigation device 150 in accordance with certain illustrated embodiments. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

It is to be appreciated that the below described embodiments generally relate to a network attack mitigation device (150) configured and operable to analyze fundamental aspects of observed network traffic, such as (but not limited to): protocols, port numbers, packet sizes, window sizes, protocol options, application-layer fields and values, to accurately differentiate attack traffic from legitimate traffic, even when there is significant variability in the attack traffic. It is to be further appreciated that the below described embodiments are described with reference to HyperText Transfer Protocol (HTTP) responses captured from network traffic, it is to be understood reference to HTTP responses is used for ease of description and exemplary purposes and thus is to be understood to be only exemplary of the type of network traffic responses analyzed by the illustrated embodiments, which for instance can also include (but is not limited to) Uniform Resource Identifiers (URIs).

With reference to FIG. 2 (and with continued reference to FIG. 1) described now is an exemplary process (referenced generally by 200), utilizing an attack mitigation device (e.g., 150) for mitigating a Distributed Denial of Service (DDOS) attack to one or more protected computer networks 100 by determining keywords for DDOS mitigation filter settings. An example of such a DDOS attack is one of a Reflection attack and/or Amplification attack. It is to be appreciated that the attack mitigation device 150 preferable intercepts network traffic packets 151 flowing from one or more external computers 106*a*-106*n*, 120 to one or more protected computer networks 100, the intercepted network traffic packets 151, in the present illustrative example, include HTTP responses consisting of either Transmission Control Protocol (TCP) packets or Datagram Protocol (UDP) packets. The intercepted HTTP responses are preferably stored in a storage device 158 operable associated with the mitigation device 150. For instance, the intercepted HTTP responses may be stored in Packet Capture (PCAP) files in the storage device 158. It is to be appreciated that in accordance with the illustrative embodiments, a predetermined number of HTTP responses (e.g., 10,000 packets) are stored in the storage device 158 (e.g., in the PCAP files) sufficient to provide an accurate representation of suspected attack traffic. It is to be further appreciated that only stored HTTP responses having a payload value greater than zero, and only packets in which the payload is verified to contain textual information are analyzed in accordance with the process 200.

Starting at step 205, the aforesaid stored packets in storage device 158 are analyzed whereby it is first determined whether if all the stored packets have been analyzed by process 200, step 210. If no, then the process 200 proceeds to step 220 in which a next unanalyzed packet is retrieved from storage 158 for analysis in step 230. At step 230 the retrieved packet, e.g., a stored HyperText Transfer Protocol (HTTP) response, is analyzed to preferably extract one or more HTTP characteristics for each stored HTTP response. In accordance with the illustrated embodiments, this preferably includes extracting HTTP characteristics such as: TCP/UDP source ports and destination ports; packet length; payload length and actual payload. Once the key characteristics of the packet have been analyzed and extracted in step 230, next in step 240 one or more patterns is determined in aforesaid extracted key characteristics. For instance, determining such patterns may include determining one or more keywords in each stored HTTP response utilizing the extracted one or more HTTP characteristics for each stored HTTP response. In accordance with the illustrated embodiments, the determined patterns may include one or more of: IP addresses; Uniform Resource Identifiers (URIs); and structured headers in HTTP replies. For example, the payload may be analyzed for determining patterns, such as: a) IP addresses (e.g., 130.131.22.17); b) Universal Resource Indicators (URI's) (e.g., www.company.com, http://www.company.com); c) structured header name/header value combinations (e.g., "X-Forwarded—For: 95.179.140.140"); and d) other typical patterns typically found in the payload.

Once the pattern characteristics have been detected (step 240), next at step 250 a hash value is determined for each determined pattern, whereby each hash value is stored in a hash structure 130 (e.g., provided by storage 158) accompanied by its respective determined HTTP characteristics. It is to be appreciated that each pattern is stored in the hash structure along with the key characteristics of the packet, which typically results in each pattern being stored multiple times. For instance, and for exemplary purposes, the following key values may be used for each pattern: a) "Keyword, protocol, destination_port"; b) "Keyword, protocol, source_port"; c) "Keyword, protocol, payload_length"; d) "Keyword, protocol, ip_packet_length"; and e) "Keyword, protocol". Additionally, the stored hash structure is preferably is provided with a counter for each pattern (e.g., initially set to 1), operable such that when the same pattern is detected, the counter for that specific pattern is increased.

After a hash value has been determined and stored (step 250), the process preferably returns to step 210 to determine whether if all the stored packets have been analyzed. If no, then the process 200 once again proceeds to step 220, as described above. If yes (all the packets stored in storage 158 (e.g., PCAP files) have been analyzed, then the process 200 proceeds to step 260 in which the hash structures stored in the hash structure 130 are preferably sorted using the counter value associated with each hash structure (step 250).

It is to be appreciated that in accordance with the illustrated embodiments, when all the stored packets have been processed, via steps 220-260, the hash structure 130 preferably contains a listing of all the keyword combinations along with a counter specifying how often each pattern is represented across the entire traffic snapshot (e.g., stored in PCAP files 158).

Next, at step 270, the process 200 preferably stores, as a mitigation filter candidate 140, each hash structure 130 accompanied by its respective determined HTTP characteristics only if the hash structure 130 contains a determined pattern consisting of at least a predetermined percentage of all determined patterns stored in the hash structure 130. For instance, the hash structure entries 130 which match a specific percentage (e.g., 5% of hash structure entries) are extracted from the sorted listing of hash structures 130, preferably accompanied with the key characteristics, such as (but not limited to): protocol+destination port; protocol+source port; protocol+payload length; protocol+IP packet length; and protocol only, which thus results in 5 lists (each sorted for each key characteristic pair).

In accordance with the illustrated embodiments, next at step 280, the process 200 proceeds to determine if each stored filter candidate 140 (step 270) contains an acceptable pattern, whereby filter candidates 140 having acceptable patterns are removed from being a mitigation filter candidate so as to prevent the occurrence of overclocking during mitigation filtering techniques (e.g., blocking good traffic). For instance, determining if a filter candidate 140 contains an acceptable pattern may include comparing a filter candidate 140 to a whitelist of acceptable patterns that are not indicative of a DDOS attack.

Next at step 290, the process 200 preferably generates a regular expression for each stored filter candidate 140 adaptable to be utilized as keywords in a DDOS mitigation filter. For instance, each regular expression is generated such that if any of the keywords in the hash structure is matched, the entire regular expression is evaluated to be true. For example, if the sorted list for the key characteristic pair "protocol" contained two entries, Keyword1 and Keyword2, which match more than 5% of the payloads in the traffic snapshot 158, the following regular expression would be generated: (Keyword1|Keyword2), which is subsequently employed for use in a mitigation filter, such as for preventing DDOS Reflection/Amplification attacks, by the mitigation device 150.

In summary, various embodiments of the present illustrated embodiments disclose a novel approach to detecting data patterns in HTTP responses for mitigating Distributed Denial of Service ("DDOS") attacks. In one embodiment, this approach takes a different perspective on how to mitigate DDOS types of attack than do conventional approaches. The disclosed approach provides a number of advantages. For instance, the above described system 150 and process 200 provides detection of patterns in all sections of DDOS attack traffic packets, making it possible to rapidly classify and mitigate new variants of DDOS attack vectors, such that when used in an automated process, it automatically mitigates complex DDOS attack vectors, while minimizing the occurrence of both overblocking and underblocking.

It is to be understood the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present illustrated embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a computer system having one or more processors and memory storing one or more programs for execution by the one or more processors for mitigating a Distributed Denial of Service (DDOS) attack to one or more protected computer networks by determining keywords for DDOS mitigation filter settings, the method comprising the steps of:

analyzing stored HyperText Transfer Protocol (HTTP) responses to extract one or more HTTP characteristics for each stored HTTP response;

determining one or more patterns having one or more keywords in each stored HTTP response utilizing the extracted one or more HTTP characteristics for each stored HTTP response;

determining a hash value for each determined pattern;

storing each hash value in a hash structure accompanied by its respective determined HTTP characteristics;

storing, as a mitigation filter candidate, each hash value accompanied by its respective determined HTTP characteristics only when the hash value contains a determined pattern consisting of at least a predetermined percentage of all determined patterns stored in the hash structure;

determining whether each stored filter candidate contains an acceptable pattern, whereby filter candidates having acceptable patterns are removed from being a mitigation filter candidate; and generate a regular expression for the each stored filter candidate utilized as keywords in a DDOS mitigation filter.

2. The method as recited in claim 1, wherein the DDOS attack is one of a Reflection attack or Amplification attack.

3. The method as recited in claim 1, further including:

intercepting network traffic packets flowing from one or more external computers to the one or more protected computer networks, the intercepted network traffic packets including HTTP responses including either Transmission Control Protocol (TCP) packets or Datagram Protocol (UDP) packets; and storing the intercepted HTTP responses in a storage device.

4. The method as recited in claim 3, wherein the storage device contains Packet Capture (PCAP) files.

5. The method as recited in claim 4, wherein a predetermined number of HTTP responses are stored in the PCAP.

6. The method as recited in claim 1, wherein only stored HTTP responses having a payload value greater than zero are analyzed.

7. The method as recited in claim 6, wherein extracting HTTP characteristics includes extracting: TCP/UDP source ports and destination ports; packet length; payload length and actual payload.

8. The method as recited in claim 1, wherein the determined patterns includes one or more of: IP addresses; Uniform Resource Identifiers (URIs); and structured headers in HTTP replies.

9. The method as recited in claim 1, further including prescribing a counter for each hash value stored in the hash structure wherein a counter is incremented when a same determined pattern is stored.

10. The method as recited in claim 9, further including sorting the hash value structure utilizing the counter value for each stored hash value such that the hash structure contains a list of all keyword combinations accompanied by a counter indicating how many times each determined pattern is present in the stored HTTP responses.

11. The method as recited in claim 1, wherein determining if a filter candidate contains an acceptable pattern includes comparing a filter candidate to a whitelist of acceptable patterns that are not indicative of a DDOS attack.

12. A computer system for mitigating a Distributed Denial of Service (DDOS) attack to one or more protected computer networks by determining patterns in HyperText Transfer Protocol (HTTP) responses, the method comprising the steps of: comprising:

one or more data bases having memory configured to store instructions;

a processor disposed in communication with said memory, wherein said processor upon execution of the instructions is configured to:

analyze stored HTTP responses to extract one or more HTTP characteristics for each stored HTTP response;

determine one or more patterns having one or more keywords in each stored HTTP response utilizing the extracted one or more HTTP characteristics for each stored HTTP response;

determine a hash value for each determined pattern;

store each hash value in a hash structure accompanied by its respective determined HTTP characteristics;

store, as a mitigation filter candidate, each hash value accompanied by its respective determined HTTP characteristics only when the hash value contains a determined pattern consisting of at least a predetermined percentage of all determined patterns stored in the hash structure;

determine whether each stored filter candidate contains an acceptable pattern, whereby filter candidates having acceptable patterns are removed from being a mitigation filter candidate; and generate a regular expression for the each stored filter candidate utilized as keywords in a DDOS mitigation filter.

13. The computer system as recited in claim 12, wherein the DDOS attack is one of a Reflection attack or Amplification attack.

14. The computer system as recited in claim 12, wherein the processor is further configured to:

intercept network traffic packets flowing from one or more external computers to the one or more protected computer networks, the intercepted network traffic packets including HTTP responses including either Transmission Control Protocol (TCP) packets or Datagram Protocol (UDP) packets; and store the intercepted HTTP responses in a storage device.

15. The computer system as recited in claim 14, wherein the storage device contains Packet Capture (PCAP) files whereby a predetermined number of HTTP responses are stored in the PCAP.

16. The computer system as recited in claim 12, wherein only stored HTTP responses having a payload value greater than zero are analyzed.

17. The computer system as recited in claim 16, wherein extracting HTTP characteristics includes extracting: TCP/UDP source ports and destination ports; packet length; payload length and actual payload.

18. The computer system as recited in claim 12, wherein the determined patterns includes one or more of: IP addresses; Uniform Resource Identifiers (URIs); and structured headers in HTTP replies.

19. The computer system as recited in claim 12, wherein the processor is further configured to prescribe a counter for each hash value stored in the hash structure wherein a counter is incremented when a same determined pattern is stored.

20. The computer system as recited in claim 19, wherein the processor is further configured to sort the hash value structure utilizing the counter value for each stored hash value such that the hash structure contains a list of all keyword combinations accompanied by a counter indicating how many times each determined pattern is present in the stored HTTP responses.

* * * * *